United States Patent [19]

Rowe

[11] 4,036,586
[45] July 19, 1977

[54] PROCESS FOR OXIDIZING SULFUR DYES

[75] Inventor: Marvin Herbert Rowe, Wilmington, Del.

[73] Assignee: E. I. Du Pont de Nemours and Company, Wilmington, Del.

[21] Appl. No.: 622,889

[22] Filed: Oct. 16, 1975

[51] Int. Cl.² .................. C09B 49/00; D06P 1/30
[52] U.S. Cl. ................................... 8/37; 8/21 A; 8/21 B; 8/21 C; 8/54.2
[58] Field of Search ............................ 8/37, 54.2

[56] References Cited

U.S. PATENT DOCUMENTS

| 3,278,254 | 10/1966 | Chadwick et al. | 8/37 |
| 3,649,194 | 3/1972 | Glanville | 23/207.5 |
| 3,864,271 | 2/1975 | Stalter | 252/99 |

OTHER PUBLICATIONS

W. C. Schumb et al., "Hydrogen Peroxide" (Reinhold, New York,) 1955, pp. 467–471.

*Primary Examiner*—Harry Wong, Jr.
*Assistant Examiner*—A. L. Clingman

[57] ABSTRACT

A process for oxidizing sulfur dyes on cellulosic fibers by contacting said fibers containing said dye in a reduced state with an aqueous hydrogen peroxide oxidizing bath solution comprising 0.01 to 0.20 grams of a soluble copper salt per liter of solution and an inhibitor to prevent excessive decomposition of the peroxide.

4 Claims, No Drawings

PROCESS FOR OXIDIZING SULFUR DYES

BACKGROUND OF THE INVENTION

1. Field of the Invention

This invention relates to a process for oxidizing sulfur dyes on natural or regenerated cellulose textile fibers. More specifically, the process of the present invention relates to oxidizing sulfur dyes on natural or regenerated cellulose textile fibers with an aqueous solution of hydrogen peroxide and a copper catalyst.

2. Prior Art

Sulfur dyes are generally less expensive than vat dyes in many applications and they are widely used to dye cotton fibers medium to heavy shades of a wide variety of colors. The continuous dyeing operation generally involves impregnating a pre-scoured cotton fabric with a solution of the dye in its reduced form, steaming the impregnated fabric for a short time to increase penetration of the dye into the fibers, washing to remove excess dye then oxidizing the dye on the fabric to render it fast.

Oxidation of reduced sulfur dyes on the fabric is usually effected commercially by a short treatment in a sodium dichromate solution acidified with acetic acid. While such dichromate-acetic acid solutions produce dyed fabrics having good light and wash fastness and wet and dry crock resistance, they nevertheless are unsatisfactory in several respects. Residual chrome salts present in the dyed fibers, even after thorough washing, give the fabric a harsh feel and cause severe friction with over-heating and burning of needles when the dyed fabric is handled on high speed sewing machines and the waste oxidizing solution creates a liquor disposal problem. The liquor disposal problem is particularly troublesome in view of the presence of chromium ions in the waste water. These are toxic and difficult to remove and strict regulations have been proposed by the EPA which limit the amount that can be in the effluent.

Aqueous hydrogen peroxide has not heretofore been regarded as an entirely acceptable replacement for the conventional dichromate-acetic acid oxidizing solutions, since many of the sulfur dyes and notably the sulfur brown or red dyes which are the most difficult to oxidize, are either removed from the fabric by the aqueous hydrogen peroxide solutions before the dye is completely oxidized or are only partially oxidized by the solution with the result that the color intensity of the treated fabric is far from satisfactory.

SUMMARY OF THE INVENTION

It has now been discovered that sulfur dyes can be effectively and advantageously oxidized on natural or regenerated cellulose textile fibers or fabrics with hydrogen peroxide and a copper catalyst.

In accordance with the invention, a process has been found which comprises oxidizing sulfur dyes on natural or regenerated cellulose fibers or fabrics by contacting said fiber or fabric containing said dyes in a reduced state with an aqueous hydrogen peroxide solution comprising 0.01 to 0.2 gram of a water-soluble copper salt per liter of aqueous hydrogen peroxide.

Thus, natural or regenerated cellulose fibers or fabrics are dyed by impregnating said fibers or fabrics, preferably in prescoured condition, with an aqueous solution of a sulfur dye in its reduced form, steaming the impregnated fibers or fabrics to insure penetration of the dye into the fibers, washing the fibers or fabrics to remove excess dye, then oxidizing the dye on the fabric by the process of the present invention. The process of the present invention involves the oxidation of dye on the fibers or fabrics by contacting the fibers or fabrics containing the dye in the leuco form with an aqueous solution of hydrogen peroxide and the water-soluble copper salt of the present invention.

Since the oxidation takes place rapidly, requiring only about 5 to 30 seconds at room temperature, it can be carried out readily in continuous operations wherein the dye-impregnated fabric in continuous length is passed continuously through the peroxide solution at a rate such as will provide the required residence time in the solution. Well known devices for passing a fabric strand alternately over and under guide rolls positioned alternately above and submerged in a treating solution can be used effectively in carrying out such continuous operations. Although continuous operation is preferred, the oxidation can be carried out batchwise, if desired. However, the oxidation time is easier to control in batchwise reactions and the complete benefits of the present invention may not be advantageous.

The invention is based upon the unexpected discovery that the presence of a copper catalyst, a water-soluble salt of copper, in a hydrogen peroxide oxidizing bath solution increases the effectiveness of the hydrogen peroxide solution in oxidizing the dye with the result that full depth of color is obtained. To accomplish this result, the concentration of the copper salt in the hydrogen peroxide oxidizing bath solution should be at least 0.01 gram per liter of hydrogen peroxide oxidizing bath solution since concentrations substantially lower than about 0.01 gram per liter of said peroxide bath solution are generally insufficiently effective to be practical. Concentrations ranging from about 0.01 to 0.20 gram per liter of said peroxide bath solution are generally effective. The preferred concentrations range from about 0.02 to 0.10 gram per liter of hydrogen peroxide oxidizing bath solution.

Any of the water-soluble salts of copper can be used in the process of the invention. Examples of suitable salts are the acetates, chlorides, sulfates and nitrates of copper. The preferred salt is copper sulfate.

Textile fibers used in the process of this invention may be in any desired form, such as knitted or woven fabric, yarn, ball warps, non-woven fabric or raw stock.

The fibers and fabrics of this invention also include blends of natural and regenerated cellulose fibers with synthetic textile fibers. In some instances, polyacrylic and polyamide textile fibers may be dyed by this invention, depending on the particular sulfur dye selected. Blends of natural or regenerated cellulosic textile fibers with polyacrylic, polyamide or synthetic linear polyester textile fibers may be used in this invention, in which case the natural and regenerated cellulose will be dyed, the polyacrylic and polyamide dyed by some sulfur dyes and not others and the polyester substantially unaffected.

The concentration of $H_2O_2$ in the oxidizing bath solution should be at least 0.1 % by weight for effective results while concentrations greater than about 0.5 % by weight should be avoided since at such greater concentrations the peroxide tends to attack the dye adversely. The preferred concentrations range from 0.15 to 0.4 % based upon the weight of the bath solution. Thus, commercially available hydrogen peroxide solutions may be diluted with water to attain the proper level of $H_2O_2$ in the bath.

The hydrogen peroxide oxidizing bath solution includes the copper catalyst, hydrogen peroxide solution and various stabilizers and acids hereinafter disclosed. The pH of the peroxide bath solution should be in the range of 2 to 7. Under conditions where the pH is more than 7, there tends to be excessive decomposition of the hydrogen peroxide. Preferably the pH of the peroxide bath solution will range from 3 to 4. Adjustment of the pH, if necessary, to within the effective range can be made with appropriate amounts of any soluble weak acid commonly employed for pH adjustment. Representative examples of such acids include acetic, formic, citric, hydroxy acetic and the acidic stabilizers described therein.

The hydrogen peroxide solution of this invention is stabilized with compounds that specifically inhibit hydrogen peroxide decomposition in the presence of copper. In commercial operations it may be convenient if the stabilizer is incorporated into the concentrated $H_2O_2$ as available commercially (usually 35 % to 70 % $H_2O_2$) to form the peroxide bath solution of this invention and before the addition of the copper catalyst. For example, U.S. Pat. No. 3,864,271 discloses the use of succinic, glutaric and adipic acids, their salts, their mono-, di- or tri-methyl derivatives and mixtures thereof as stabilizers. U.S. Pat. No. 3,649,194 discloses the use of phenol, paramethoxyphenol, allyl alcohol, crotyl alcohol, or cis, 1,4,but-2-ene-diol as stabilizers for metal containing hydrogen peroxide solutions. Other compounds inhibiting decomposition of $H_2O_2$ in the presence of copper include the alkylidene diphosphonic acids such as aminotri (mehtylenephosphonic acid) and soluble alkali salts of these acids, in combination with an organic hydroxy compound selected from the group consisting of allyl alcohol, methallyl alcohol, phenol, o-chlorophenol, o-nitrophenol and the like.

While convenient to have the inhibitor present in concentrated hydrogen peroxide as described, the oxidizing solution can be prepared at the concentration desired for use and one or more of the inhibitors can be added separate from the hydrogen peroxide.

The stabilizers of this invention will effectively control copper catalyzed decomposition of $H_2O_2$ at temperatures of the process of this invention. The oxidation of the dye with the peroxide solution is preferably effected at a temperature of about 60° F to about 140° F. However, lower and higher temperatures, e.g., up to 170° F or higher, can be used but appear to offer no added advantage. At temperatures above 170° F, the decomposition of hydrogen peroxide increases.

The term sulfur dyes as used herein means in the reduced state in alkaline sulfide or polysulfide solutions, dyes of the formula D(—Sn—Sx)m where $d$ = chromophore or reduced chromophore
$n$ = 0 to 6
$x$ = hydrogen or sodium
$m \geq 1$
said dyes being applicable to regenerated cellulose fibers or fabrics and which dyes may be oxidized after application to regenerated cellulose fibers or fabrics. Some of these dyes are more difficult to oxidize than others. This invention is especially applicable to the blues, navies and red-browns which are the most difficult sulfur dyes to oxidize. The most preferred dye being the sulfur reds, e.g., sulfur red 10, Color Index No. 53228.

In the following examples, several yards of a 4-inch strip of a pre-scoured, bleached, 100 % cotton twill was padded with a freshly prepared solution of a commercial sulfur dye in reduced form following the well known conventional procedure. This involved impregnating the fabric at room temperature with about an equal weight of the reduced dye solution, steaming the impregnated fabric for about 1 minute, then squeezing it out to a liquor content about equal to the weight of the fabric. Such damp, dye-impregnated fabric was freshly prepared prior to each oxidation experiment. The commercial sulfur dyes used were identified by their color index.

It was found that hydrogen peroxide bath solutions similar to those employed in the following examples, except that they contained no copper salt, did not effectively oxidize the dye-impregnated fabric as shown by the weaker depth of shade.

The following examples serve to further illustrate the invention. In the examples all percentages are by weight unless otherwise indicated. Reference to the amount of a component in grams per liter is the weight in grams of the component per liter of hydrogen peroxide oxidizing bath solution defined above.

EXAMPLE 1

The fabric described above was padded with Sodyesul Liquid Brown 5 RCF dye, Color Index Name "Sulfur Red 10", Color Index No. 53228, manufactured by Martin-Marietta Chemicals, using 6 oz/gal of said dye. The pad temperature was 90° F with 62 % pickup. Steam was applied for 30 seconds and water rinsing for 10 seconds at room temperature. The fabric was divided into 3 pieces.

Each of the 3 pieces were passed through one of the following peroxide oxidizing solutions at 120° F for 30 seconds.

|  | 1 (Control) | 2 (Control) | 3 |
|---|---|---|---|
| $H_2O_2$ (35% by weight) | 4.0 g/l | — | — |
| $H_2O_2$ (50% by weight containing 1.4% of a mixture of succinic and adipic acid) | — | 2.8 g/l | 2.8 g/l |
| Acetic acid (glacial) | 4.0 g/l | 4.0 g/l | 4.0 g/l |
| Copper sulfate $CuSO_4 \cdot 5H_2O$ | — | — | 0.25 g/l |
| pH | 3.0 | 3.0 | 3.0 |

The fabrics were rinsed with a solution containing 2.0 grams of oleate soap per liter of solution for 30 seconds at 200° F and then rinsed with water and dried.

A comparison with the controls 1 and 2 showed that the depth of color therein was substantially weaker than when copper sulfate was used and that the dye in the controls were not completely oxidized.

EXAMPLES 2–6

The procedure described in Example 1 was followed except that the amount of copper sulfate ($CuSO_4 \cdot 5H_2O$) was 0.01, 0.02, 0.05, 0.1 and 0.2 grams per liter of peroxide solution. A control was also run with no copper sulfate. The depth of shade of the fabric from the control run was considerably weaker than all the runs with copper sulfate. However, the oxidation without copper sulfate was incomplete. At the concentration of 0.01 gram per liter the depth of shade was slightly weaker than the 0.2 gram per liter concentration. The runs at 0.2, 0.1, 0.05 and 0.02 were essentially equal in depth of shade. The table below summarized the data:

| | Shade Effect* | | Time for Complete Oxidation (Seconds) | |
|---|---|---|---|---|
| | Series No. 1 120° F for | Series No. 2 120° F for | | |
| $CuSO_4 \cdot 5H_2O$ g/l | 5 seconds | 30 seconds | Series No. 2 | Series No. 3 |
| 0.20 | 5 | 5 | 5 | — |
| 0.10 | 5–4W | 5 | 10–15 | — |
| 0.05 | 4W | 5 | 15–20 | — |
| 0.02 | 4–3W | 5 | 20–25 | 10–15 |
| 0.01 | 3W | 4W | 20–30 | 20–25 |
| 0 | 2W | 2W | Over 30 | — |

*Described in AATCC Technical Manual (Volume 50, 1974) AATCC Evaluation Procedure 1, pages 95–96

What is claimed is:

1. In the continuous process of oxidizing sulfur dyes on cellulosic fibers by contacting said fibers containing said dye in a reduced state with a hydrogen peroxide solution comprising decomposition inhibitors, the improvement wherein the hydrogen peroxide solution of 0.1 % to 0.5 % by weight of $H_2O_2$ and a pH of from 2 to 7 comprises from 0.01 to 0.2 gram of a water-soluble copper salt per liter of said peroxide solution.

2. The process of claim 1 wherein the copper salt concentration is 0.02 to 0.10 gram per liter.

3. The process of claim 1 wherein the copper salt is selected from copper nitrates, copper acetates, copper chlorides and copper sulfates.

4. The process of claim 3 wherein the copper salt is $CuSO_4 \cdot 5H_2O$.